United States Patent [19]

Shimakawa

[11] 3,945,001
[45] Mar. 16, 1976

[54] NUMERIC DISPLAY CONFIGURATION

[75] Inventor: George Shimakawa, Suwa, Japan

[73] Assignee: Kabushiki Kaisha Suwa Seikosha, Tokyo, Japan

[22] Filed: Oct. 21, 1974

[21] Appl. No.: 516,713

Related U.S. Application Data

[63] Continuation-in-part of Ser. No. 302,335, Oct. 30, 1972, abandoned.

[30] Foreign Application Priority Data

Nov. 1, 1971  Japan............................ 46-86204

[52] U.S. Cl................................. 340/336; 40/28 C
[51] Int. Cl.²............................................ G08B 5/36
[58] Field of Search ............ 40/28 C, 130 R, 132 R; 350/160 LC; 340/336, 378 R; 58/50 R

[56] References Cited
UNITED STATES PATENTS

| | | |
|---|---|---|
| 3,672,155 | 6/1972 | Bergey et al........................ 58/50 R |
| 3,702,723 | 11/1972 | Borden............................ 40/28 C X |
| 3,721,084 | 3/1973 | Dargent .............................. 58/50 R |
| 3,722,206 | 3/1973 | Bergey ................................ 58/50 R |
| 3,786,486 | 1/1974 | Torresi................................ 340/336 |
| 3,827,043 | 7/1974 | Maezawa ............................ 340/336 |

*Primary Examiner*—Wm. H. Grieb
*Attorney, Agent, or Firm*—Blum Moscovitz Friedman & Kaplan

[57] ABSTRACT

An improved numeric display is based on the usual seven-segment display, but the segments are both curved and straight in the interest of making the display more legible than the usual segmented display. A particular feature is the division of the usual lower left-hand segment into three portions, all of which are activated simultaneously, as a result of which those numerals involving the lower left-hand segment and the bottom segment are enhanced in appearance. Moreover, the corners of the display are rounded, a feature which improves both the legibility and the appearance of the display.

8 Claims, 5 Drawing Figures

NUMERIC DISPLAY CONFIGURATION

CROSS REFERENCE TO RELATED APPLICATION

The present Application is a Continuation-In-Part of my co-pending application Ser. No. 302,335, filed Oct. 30, 1972, for IMPROVED NUMERIC DISPLAY CONFIGURATION, now abandoned

BACKGROUND OF THE INVENTION

The segmented numeric display where the segments are individually activated by means of a switching and logic system is somewhat difficult to read, particularly for those who are not accustomed to this type of display. Moreover, such displays are angular and, viewed typographically, are unattractive in appearance. The difficulty with respect to legibility stems from the fact that the curves present in the printed numerals 2, 3, 5, 6, 8, 9 and 0 are absent. As for the appearance of segmented digits, the complete absence of curves in conventional numeric displays results in a monotonous appearance and a lack of the beauty associated with sweeping curves. This particular aspect is especially important in such applications as wrist-watch dials featuring digital displays.

SUMMARY OF THE INVENTION

A digital display in accordance with the present invention features curves at the outer edges of the left and right hand upper and lower portions of the numeric display. Furthermore, gaps between the top and bottom vertical segments are filled in.

To enhance the appearance of the numerals displayed by the present arrangement, the bottom segment is given a curved shape rather than the usual hexagonal shape, and the bottom left hand segment has been divided into three portions partly surrounding the curved bottom segment.

The display is particularly suitable for use in liquid crystal and light-emitting diode display devices.

Accordingly, an object of the present invention is to provide an improved segmented digital display of increased legibility.

Another object of the present invention is to provide an improved segmented digital display of enhanced appearance.

Still other objects and advantages of the invention will in part be obvious and will in part be apparent from the specification.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 3 is a cross-sectional view of the embodiment of FIG. 2 taken along the line 3 — 3.

DESCRIPTION OF THE PREFERRED EMBODIMENTS

Figure 1:
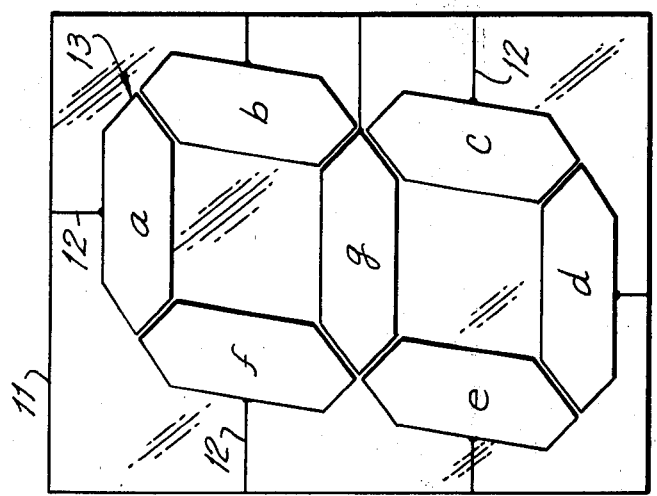
FIG. 1 shows a conventional numeric display consisting of 7 hexagonal segments.

In a conventional numeric display such as is shown in FIG. 1, and indicated generally by the reference numeral 13, seven segments, usually hexagonal in form, are used for displaying the digits from 0 to 9. Considering, for the moment, only the digit 1, it can be seen that the segments labelled $b$ and $c$ are used, and that the appearance of the digit will suffer from the presence of two gaps on either side of the mid-point of the digit. As another example, the digit 7 will suffer from the same two gaps and where there should be a single corner joining the top and side portions of the digit, there will instead be two corners connected by a diagonal line.

The segments are selectively activatable by exterior driving circuitry (FIG. 4) to which the segments are connectable by leads 12. Where the segments are part of a liquid crystal display device they are in the form of conductive films on a plate 11.

Figure 2:
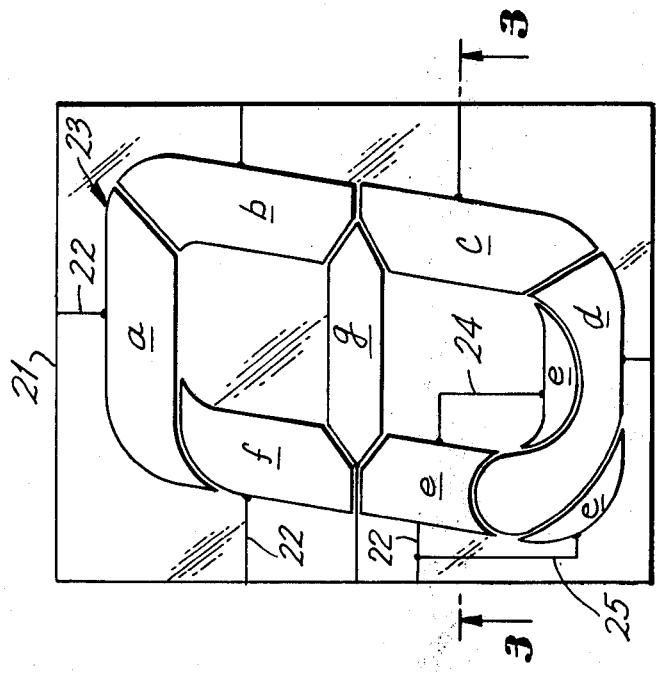
FIG. 2a shows another embodiment of the present invention.

An arrangement of segments for displaying the digits from 0 to 9 in accordance with the present invention is shown in FIG. 2. As can be seen, the outer gaps between segments $e$ and $f$ on the one hand, and between $c$ and $b$ have been removed. Also, the junction between the inner and outer edges of segments $a$ and $b$ has been rounded, and the same thing has been done for the junctions between $a$ and $f$, and $c$ and $d$. Further, the vertical dimension of $g$ has been decreased with the result that the gaps between $e$ and $f$ on the one hand and between $b$ and $c$ have been decreased in size. The result is that the appearance of digits using these pairs of segments has been improved.

The most important change is that made with respect to segments $e$ and $d$ of the prior art. In the arrangement according to the present invention segment $e$ of FIG. 1 has been divided into three portions, all labelled $e$, and hexagonal segment $d$ has been altered into the curved segment labeled $d$.

In FIG. 2 the segments are shown as an assembly indicated generally by the reference numeral 23 on a plate 21. Leads 22 can connect one of the portions of segment $e$ and all of the remaining segments selectively to external driving circuitry. The other two portions of segment $e$ are preferably connected to said one portion by leads 24 and 25.

Figure 2A:
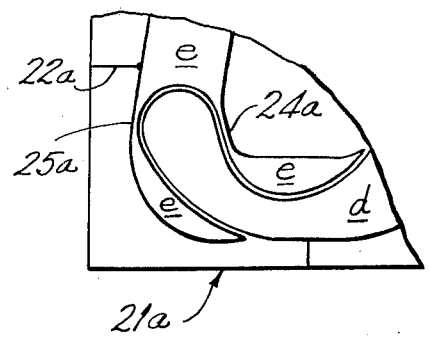
Figure 3:
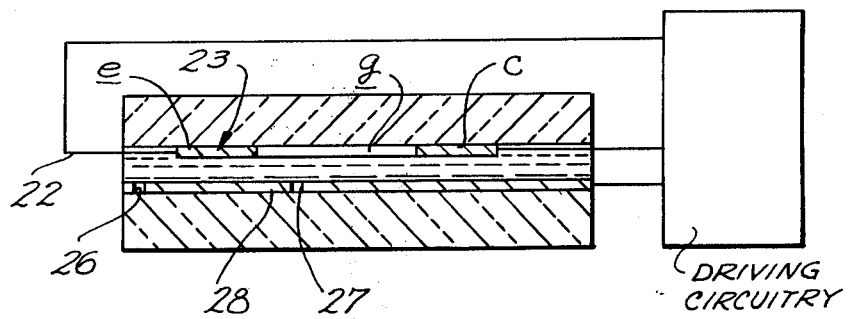
FIG. 3 shows an embodiment of a numeric display in accordance with the present invention.

Alternatively, one or both of the remaining portions of segment $e$ can be connected directly to the driving circuitry. Another means of connecting the separate portions of $e$ is shown in FIG. 2a. Here narrow strips of conductive film 24a and 25a act as leads for connecting the lower portions of $e$ to the portion above the left-hand end of segment $d$.

Where the assembly 23 is part of a liquid crystal display device, the opposed plate has a conductive segment 28 (FIG. 3) on the interior surface thereof also connectable to said external driving circuitry. Conductive segment 28 is so shaped that only the segments on the plate 21 (FIG. 2) and on plate 21a (FIG. 3) become visible; in other words, leads 22, 24 and 25 (FIG. 2) and 22a, 24a and 25a (FIG. 2a) will not become visible. Gaps 26 and 27 in FIG. 3 represent schematically open areas in conductive segment 28, said open areas being in registry with leads 22, 24 and 25 of FIG. 2 and 22a, 24a and 25a of FIG. 2a.

The following Table shows the segments to be activated for each of the digits:

TABLE

| DIGIT | SEGMENTED COMBINATIONS |
|---|---|
| 1 | b c |
| 2 | a b g e d |
| 3 | a b g c d |
| 4 | b c f g |
| 5 | a f g c d |
| 6 | f e d c g |
| 7 | a b c |
| 8 | a b g f e d c |
| 9 | a b g f c |
| 0 | a b c d e f |

Although the display shown in FIG. 2 appears to have nine segments, actually all three positions constituting segment e are activated at the same time. Consequently, the number of leads from the control system (not shown) is the same as for the segmented numeric display system of the prior art. The logic of the display is exactly the same as for conventional sevenbar displays.

Figure 4:
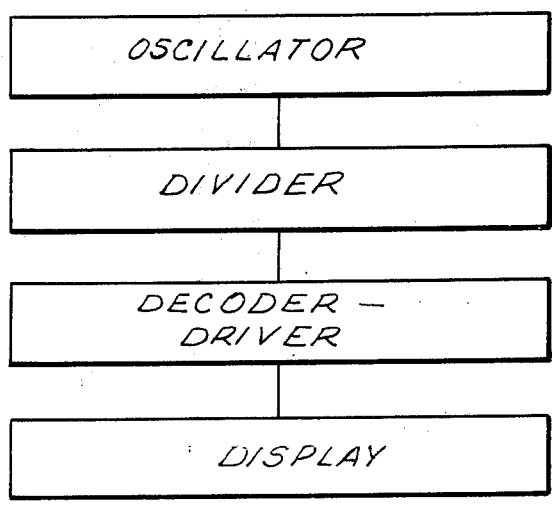
FIG. 4 shows schematically driving circuitry appropriate for use with the displays of the present invention.

Driving circuitry is indicated schematically in FIG. 3 and in box-diagram form in FIG. 4. As shown in FIG. 4, driving circuitry consists of an oscillator which puts out a standard time frequency, a divider and a decoder-driver which drives the display. This type of circuitry is shown in considerable detail in many sources. Specific examples are Bergey et al. U.S. Pat. No. 3,672,155, patented June 27, 1972, Bruno M. Dargent, U.S. Pat. No. 3,721,084, patented Mar. 20, 1973, and J. M. Bergey, U.S. Pat. No. 3,722,206, patented Mar. 27, 1973. It should be noted that, with appropriate modification, such modification being well-known, the circuitry is also appropriate for use with light-emitting diodes as well as liquid crystal displays.

The segmented display of the present invention produces digits which are more legible than those of the prior art, which are pleasantly curved and which are more in accord with the representation of digits as produced either by conventional printing or writing. Furthermore, most of the sharp angles of the conventional segmental display are eliminated and the number of leads required for activating the segmental display of the present invention is no greater than is required for the conventional system.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An improved numeric seven-segment display device for showing any single digit from 0 to 9, comprising a top, a right-upper, a right-lower, a left-upper, a left-lower, a middle and bottom segments, the totality of said segments forming a figure-8 with essentially vertical sides and horizontal top, middle and bottom, said bottom segment being thinner at its mid-portion than said top segment and being concave on its upper edge and convex on its lower edge, and extending at its left end into the bottom of the space normally occupied by the left-lower segment of a conventional seven-segment numeric display, said left-lower and bottom segments being mutually interposed and said bottom segment dividing said left-lower segment, said left-lower segment being in three portions, the first of said three portions extending from proximate the bottom of said left-upper segment to the left end of said bottom segment, the second of said portions having an essentially horizontal upper edge and a lower edge conforming to the upper concave edge of said bottom segment and the third of said portions lying beneath the left-hand end of said bottom segment, said second and said third portions having size, shape and position such that in combination with said bottom segment a strip is formed which has essentially the same transverse dimension as said top segment; and electric circuitry connected with said segments for selective actuation of same, said electric circuitry including electrical connections between said three portions of said left-lower segment so that said three portions are always actuated together.

2. The improved numeric seven-segment display device as defined in claim 1, wherein said electrical connections between said portions of said left-lower segment consist of narrow strips of transparent conductive film proximate but separate from said extending left end of said bottom segment.

3. The improved numeric seven-segment display device of claim 1, wherein said left-upper and said left-lower segments have an apparent common boundary and said right-upper and said right-lower segments have an apparent common boundary.

4. The improved numeric seven-segment display device of claim 1, wherein said top segment overlaps said left upper segment and tapers to a downwardly extending point.

5. The improved numeric seven-segment display device of claim 1, wherein said middle segment is narrower in its transverse dimension than said top and side segments.

6. The improved numeric seven-segment display device of claim 1, wherein the right side of said left-upper segment curves to the right and the top portion thereof merges with the bottom edge of said top segment.

7. The improved numeric seven-segment display device of claim 1, wherein said top, right-upper, right-lower, bottom and third portion of left-lower segments are curved at suitable portions so that said FIG. 8 has rounded corners.

8. The improved numeric seven-segment display device of claim 1, further comprising opposed first and second plates, at least one of said plates being transparent, one of said plates having thereon said segments, leads for connecting said segments to exterior driving circuitry on the inner surface of said one plate, the other of said plates having on the interior surface thereof a conductive film and a lead for connecting said conductive film to said exterior driving circuitry, said conductive film being shaped so that only said segments can be made visible by said driving circuitry when said seven-segment display and said film on said other plate are connected to said circuitry.

* * * * *